US008744946B2

(12) United States Patent
Shelton

(10) Patent No.: US 8,744,946 B2
(45) Date of Patent: Jun. 3, 2014

(54) SYSTEMS AND METHODS FOR CREDIT WORTHINESS SCORING AND LOAN FACILITATION

(75) Inventor: Thomas Shelton, New York, NY (US)

(73) Assignee: Quest Growth Partners, LLC, New York, NY (US)

(*) Notice: Subject to any disclaimer, the term of this patent is extended or adjusted under 35 U.S.C. 154(b) by 134 days.

(21) Appl. No.: 12/479,393

(22) Filed: Jun. 5, 2009

(65) Prior Publication Data
US 2010/0010935 A1    Jan. 14, 2010

Related U.S. Application Data

(60) Provisional application No. 61/059,827, filed on Jun. 9, 2008.

(51) Int. Cl.
*G06Q 40/00* (2012.01)

(52) U.S. Cl.
USPC ...................................................... 705/36 R

(58) Field of Classification Search
USPC ...................................................... 705/36 R
See application file for complete search history.

(56) References Cited

U.S. PATENT DOCUMENTS

| 2002/0107789 | A1* | 8/2002 | Wood | 705/38 |
| 2003/0046223 | A1* | 3/2003 | Crawford et al. | 705/38 |
| 2005/0273430 | A1* | 12/2005 | Pliha | 705/42 |
| 2006/0080241 | A1* | 4/2006 | Comstock | 705/40 |
| 2007/0124235 | A1* | 5/2007 | Chakraborty et al. | 705/38 |

OTHER PUBLICATIONS

A dynamic model of the Irish economy: Quinlan, P M. Journal of the Statistical and Social Inquiry Society of Ireland (1957-1962): 1.*
New Studies in Behavioral Science and Public Policy: The American Behavioral Scientist (pre-1986) 4.9 (May 1961): 24.*
The Implications of Retirement Security Systems for Consumer Behavior: Williams, Walter. Journal of Risk and Insurance (pre-1986) 32.3 (Sep. 1965): 349.*

* cited by examiner

*Primary Examiner* — Hani M Kazimi
*Assistant Examiner* — Hatem M Ali
(74) *Attorney, Agent, or Firm* — Meister Seelig & Fein LLP

(57) ABSTRACT

The present invention relates to methods, systems and computer readable media for generating a financial score. In an embodiment, the method for generating a financial score comprises collecting and aggregating sets of data, estimating income paths based on the collected data, determining risk associated with the income path and generating a financial score. Exemplary systems and computer readable media include program code for executing a method for generating a financial score and processing financial instruments on a network.

31 Claims, 13 Drawing Sheets

SYSTEMS AND METHODS FOR CREDIT WORTHINESS SCORING AND LOAN FACILITATION

CLAIM TO PRIORITY

This application claims priority to provisional U.S. patent application Ser. No. 61/059,827 entitled "SYSTEM AND METHOD FOR AGGREGATING AND DEVELOPING AN EARNINGS POTENTIAL INDEX ON A BORROWER IN AN ON-LINE LOAN PROCESS, USING A SOCIAL NETWORKING PARADIGM", filed on Jun. 9, 2008, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to methods of assessing credit worthiness through computerized scoring engines and assessing and processing financial arrangements utilizing such credit assessments and scoring engines.

BACKGROUND OF THE INVENTION

With the growth of computing systems and various interfacing advancements, one area having not achieved significant development is online banking. In particular, private lending and old credit scoring techniques continue to inhibit the liquidity of capital available to individuals. These techniques fail to support the individual, in part because of the literal translation from the brick and mortar lending institutions to the online world.

Prior techniques for credit scoring or assessing credit worthiness generally require some sort of credit history. With a short or no credit history, an individual is generally not able to procure financing. In addition, individuals having less than extensive credit history only qualify for financing with high interest rates, hidden fees, limited lines of credit, short terms and prepayment penalties. In addition, assessing risk for individuals or loans or loan portfolios using only traditional credit history risk assessment limits the accuracy and scope of assessment of potential risk, discouraging financial transactions which might otherwise be beneficial for parties involved. There is thus a substantial need for alternative techniques for assessments of credit worthiness.

One set of individuals particularly apt to this analysis is students. Currently, the terms for private loans available to students are not nearly as favorable when compared to their federal counterparts. Private student loans typically include large origination fees, variable interest rates tied to the highest prime rate and stiff penalties for missed payments. Using the old credit scoring techniques, private lenders are unable to adequately assess the risk for each particular student. Since private lenders base their analysis largely on the credit score of the applicant and because many applicants have a short credit history, if at all, the risk assessment with the applicant is inherently flawed.

Accordingly, there is a need in the market for an online financial marketplace to properly and accurately assess the credit worthiness of individuals with little or no credit history. In that respect, there is also a need in the market for a financial scoring system that accurately predicts an income path and associated risks thereof for an individual with little or no credit history.

SUMMARY OF THE INVENTION

The present techniques are directed to methods, systems and computer readable media comprising program code for generating a financial score. According to one embodiment, the method comprises collecting a first data set of user-independent information, collecting a second data set of user information, aggregating information from the first data set with information from the second data set to create an aggregate data set, storing the aggregate data set on a computer readable medium, estimating an income path for a user on the basis of information in the aggregate data set, determining risk associated with the income path, and generating a financial score for the user.

An embodiment of the invention further comprises collecting the second data set of comprises collecting educational information, receiving user attribute values comprising an age value, an education value and an occupation value, calculating a distribution of change for the income path, displaying a numerical value and a graphical representation of the income path.

A computerized system and computer readable media embodiment of the invention comprises program code that when executed by a programmable processor causes execution of a method for generating a financial score, comprise computer readable media having program code for collecting a first data set of user-independent information, collecting a second data set of user information, aggregating information from the first data set with information from the second data set to create an aggregate data set, storing the aggregate data set on a computer readable medium, estimating an income path for a user on the basis of information in the aggregate data set, determining risk associated with the income path and generating a financial score for the user.

In a further embodiment of the invention, a method for processing financial instruments on a network comprises displaying, on a networked device, an offer to enter into a financial contract associated with a borrower, auctioning the financial contract to a plurality of lenders, providing borrower information to a given lender, the borrower information comprising a score, receiving bid information from the given lender, the bid information from the given lender matched to the financial contract; and storing auction information on a computer readable medium.

In other embodiments, the systems and computer readable media include program code that, when executed by a programmable processor, cause execution of a method for processing financial instruments on a network. The systems and computer readable media having a computer readable medium with program code for providing an offer to enter into a financial contract associated with a borrower, auctioning the financial contract to a plurality of lenders, providing borrower information to a given lender, the borrower information comprising a score, receiving bid information from the given lender, the bid information from the given lender matched to the financial contract, and storing auction information on a computer readable medium.

In other embodiments, a method for processing financial contracts online, the method comprises providing or displaying a social network interface to connect a borrower with a plurality of lenders, using a pricing engine to generate a financial score for the borrower on the basis of an income path and an input received from the borrower, executing program code associated with the pricing engine on a processor, generating terms for a financial contract associated with the borrower on the basis of the income path and the input received from the borrower, auctioning the financial contract associated with the borrower to a plurality of lenders; and using a peer-to-peer model to allow a given lender to place a fractional bid on the financial contract associated with the borrower.

BRIEF DESCRIPTION OF THE DRAWINGS

Embodiments of the invention are illustrated in the figures of the accompanying drawings which are meant to be exemplary and not limiting, in which like references are intended to refer to like or corresponding parts, and in which.

DETAILED DESCRIPTION

In the following description, reference is made to the accompanying drawings that form a part hereof, and in which is shown by way of illustration specific embodiments in which the invention may be practiced. It is to be understood that other embodiments may be utilized and design changes may be made without departing from the scope of the present invention.

Figure 1:
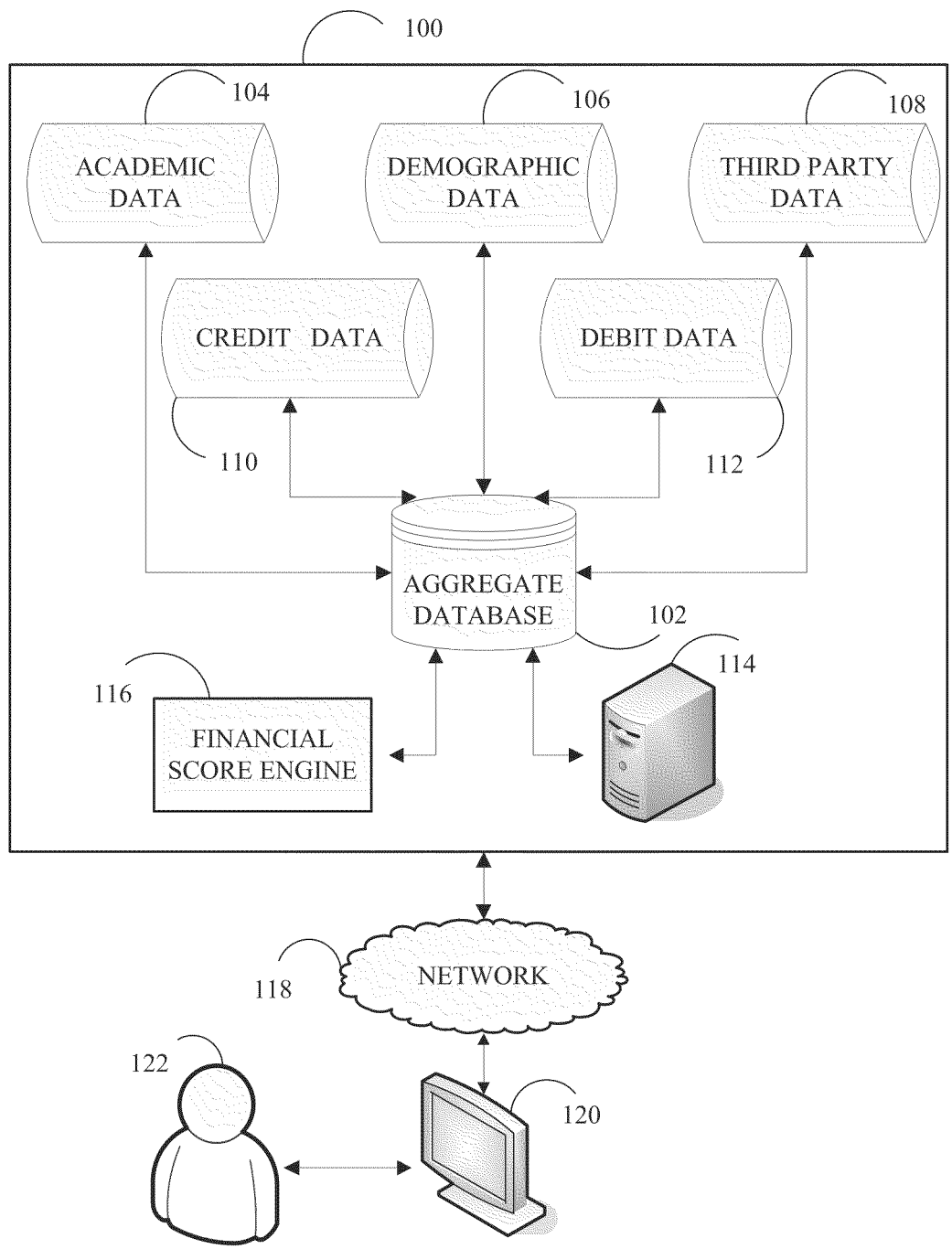
FIG. 1 illustrates a block diagram of a system for generating a financial score according to one embodiment of the present invention.

A financial scoring engine, an embodiment of which is referred to in FIG. 1, 116, is operative to analyze data in generating a financial score to facilitate assessment of credit worthiness. The score may be referred to herein without intent to confer differing meanings as a financial score, a credit score, a consumer score, a people score or a human capital score. The financial scoring engine is usable in numerous environments and applications. For instance, the results of the financial scoring engine may be offered to the public or subsections thereof, such as to individuals or institutions, in the same manner as access to prior credit scores such as are provided by Fair Isaac Corporation (FICO), for instance, through an on-line order form. In some embodiments, the financial scoring engine's outputs are available through a network interface, such as is described with reference to FIG. 1.

As another example, the financial scoring engine is also usable and implemented in evaluating existing or prospective individual loans or loan portfolios, such as for financial institutions and the like, to assess suitability of purchase of such portfolios or likelihood of returns on such portfolios. In some embodiments, the financial scoring engine operating as a tool for loan or loan portfolio assessments is equipped with a user interface. In other embodiments, the financial scoring engine is used as input to other financial processing tools. Thus, the financial scoring engine is usable and is intended for both stand-alone use or as an independent system with direct output to users or integrated into a larger financial system such as a lending system including a peer-to-peer and/or social networking lending system, or in some combinations of the foregoing.

In one embodiment, the financial scoring engine 116 operates within a system designed to provide financial data, including but not limited to financial reports on individuals, groups of individuals, trends, institutions, industries, vertical markets and the like. For example, the financial scoring engine 116 may provide data to a lender, a group of lenders, financial institutions, and other third parties to use as part or the entirety of a service or product it provides. Additionally or alternatively, the data provided by the financial scoring engine provides a lender with data to be used in still further assessments or applications such as to conduct market research or contribute to loan or portfolio assessments along with other techniques or means.

In an embodiment, an object of the financial scoring engine is to price student loans. Alternatively, the scoring engine may generate terms for, facilitate creation of, or evaluation of a human capital contract, such as where a person pays a fixed percentage of their income for a period of time. In further embodiments, the scoring engine may generate terms for, facilitate creation or, or evaluation of, an income contingent loan, which may be a hybrid of traditional loans and a human capital contract loan structure. The provision of these and other types of loan and credit agreements may be facilitated or enhanced through the use of the scoring engine.

In some embodiments, the financial scoring engine predicts how much an individual will earn in the future. By way of example, with an expected income trajectory and deviations from the trajectory, the financial scoring engine is operative to learn how likely individuals are to repay their loans. In some embodiments, the financial scoring engine uses existing data to predict an expected income path for a given individual with or without significant credit history. The financial scoring engine predicts what deviations from that expected income path are likely for that given individual. Based on predicted income paths, the financial scoring engine determines the rates at which individuals deviate from the predicted income path. The financial scoring engine further operates to simulate hypothetical or projected income streams for an individual person, group of persons or financial undertaking, such as a loan. Thereby, the financial scoring engine generates a set of the possible realizations of income in the future and the likelihood of payment ability for risk assessment.

There are many software applications useful for modeling and simulating the income paths described above. For example, STATA is a comprehensive integrated statistical package that provides data analysis tools for data management. Another example is MATLAB®, a high-level technical computing language and interactive environment for algorithm development, data visualization, data analysis, and numeric computation. Financial modeling used by the financial scoring or processing engine may be accomplished with MATLAB, STATA or similar software applications. In other embodiments, other or custom software applications may be written to perform the financial modeling.

FIG. 1 illustrates a block diagram of a system 100 for generating a financial or credit score according to one embodiment of the present invention. The system 100 includes an aggregate database 102, an academic data store 104, a demographic data store 106, a third party data store 108; a credit data store 110 and a debit data store 112. The aggregate database 102 is also in communication with a server 114, a financial score engine 116 and a network 118. The network 118 is in communication with a client device 120 and a user 122.

In the system 100, the aggregate database 102 and the data stores 104-112, may be any suitable type of database, data store or data storage device utilizing known database and data storage technologies as recognized by one skilled in the art, including the storage of data into tables and records or more or less structured data storage, processing and accessing arrangements. The data stores 104-112 may include a computer readable medium or any suitable type of physical device capable of having executable instructions stored thereon, for example the data stores 104-112 may include an internal memory within a computing system, or in another example the data stores 104-112 may be an optical disc having the instructions stored thereon. It is recognized that the examples of internal memory and an optical disc are exemplary in nature and are not limiting as to the data stores 104-112.

The third party data store 108 may include data from numerous sources, including data imported from third parties that collect financial information from academic institutions. For example, the data may include the common line school certification request, a disbursement roster, a disbursement of alternative funding roster, data from the ScholarNet website, data from the OpenNet website, data from the National Student Loan Clearing House and data gathered by academic institutions to comply with federal regulations or other non-academic data sources.

The server 114 may be any suitable type of server utilizing known server technology as recognized by one skilled in the art, including the receipt of computer program instructions and processing input, output and read/write operations. The server 114 also includes a processing device (not pictured). The processing device may be any suitable type of processing device operative to perform processing operations as described in further detail below.

The network 118 may be any suitable type of networking interconnection allowing for networked communication. The client device 120 may be any suitable type of processing device and is not limited to the illustrated computer, but may also include any mobile device, and more generally relates to any processing device operative to communicate with the system 100 via a networked connection, e.g. the network 120.

According to one embodiment of the invention, a given client device 120 is general-purpose personal computer comprising a processor, transient and persistent storage devices, input/output subsystem and bus to provide a communications path between components comprising the general-purpose personal computer and a user 122 of the system. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Figure 2:
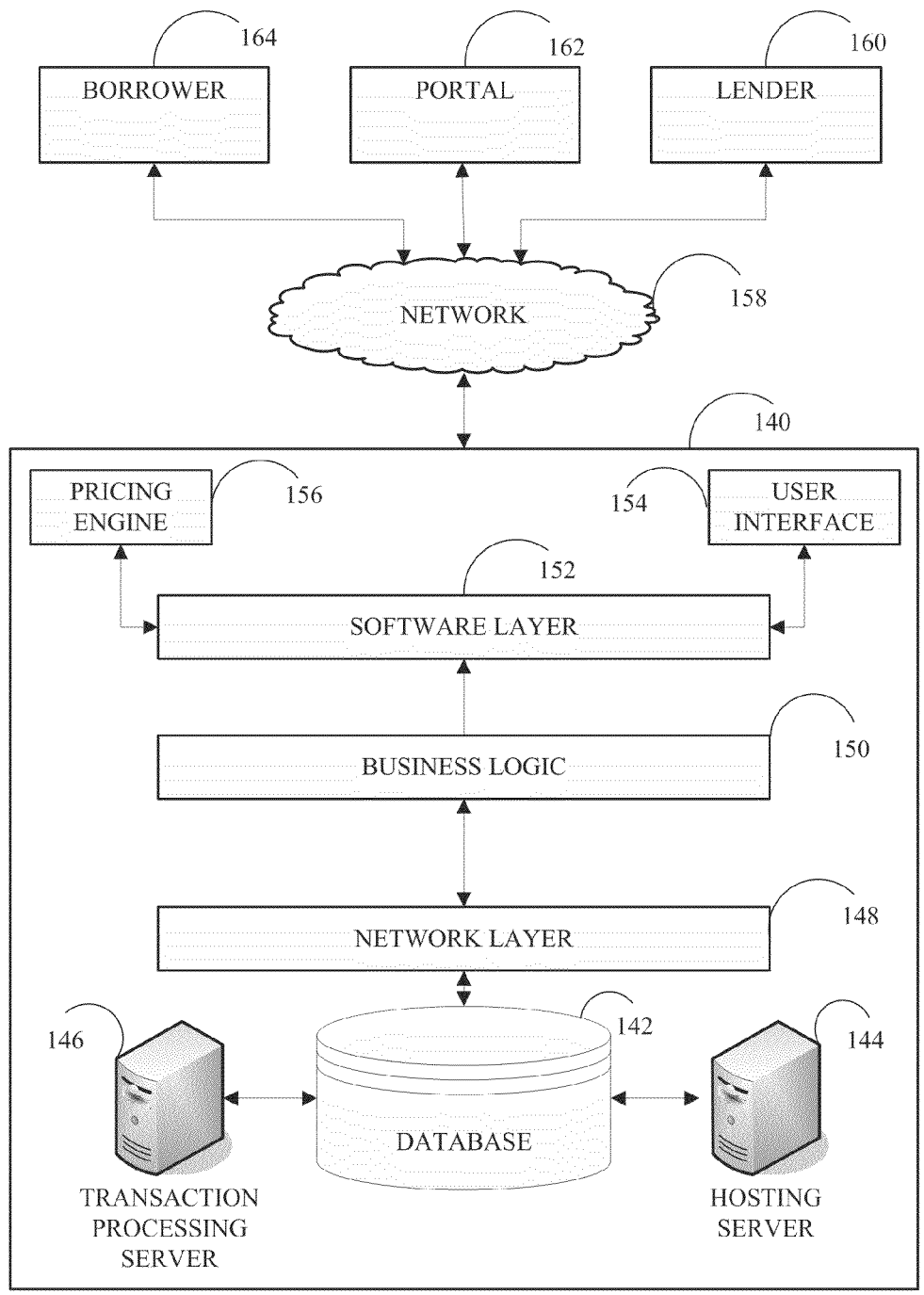
FIG. 2 illustrates a block diagram of a system for processing financial contracts online according to one embodiment of the present invention.

FIG. 2 illustrates a block diagram of a system 180 for processing financial contracts online according to one embodiment of the present invention. The system 140 includes a database 142, a hosting server 144 and a transaction processing server 146. The system 140 further includes a network layer 148, a business logic layer 150 and a software layer 152. The software layer 152 of system 140 includes a user interface module 154 and a pricing engine 156. The system 140 is in communication with a network 158 which may be in operative communication with a lender 160, a portal 162 and a borrower 164.

As with the server 114 of FIG. 1, the hosting server 144 and the transaction processing server 146 may be any suitable type of server utilizing known server technology as recognized by one skilled in the art, including the receipt of computer program instructions and processing input, output and read/write operations. In one embodiment, the network layer 148 may be any interconnected communications channel, e.g. the Internet. In another embodiment, the network layer 148 may include any number and combination of Internet routers, firewalls, proxy servers, web servers, database clusters, e-mail servers, domain controllers, XML gateway servers, tape backup units, DNS servers, monitoring agent servers, SMTP server, encryption servers, content smart switches, financial processing servers, mobile servers, etc. In addition, the combination of hardware components may be virtualized across a network.

The business logic layer 150 may include a combination of hardware and software running on the various hardware components on the network layer. The software layer 152 includes a user interface module 154 and a pricing engine module 156. In one embodiment, the software layer includes a number of applications running on the business logic layer 150 and network layer 148. The user interface module 154 and pricing engine module 156 may be software applications running on the business logic layer 150 and the network layer 148. The network 158 is like that in the description of the network 118 of FIG. 1 above. The borrower 164, portal 162 and lender 160 modules may be versions of application software running on the software layer 152.

Figure 3:
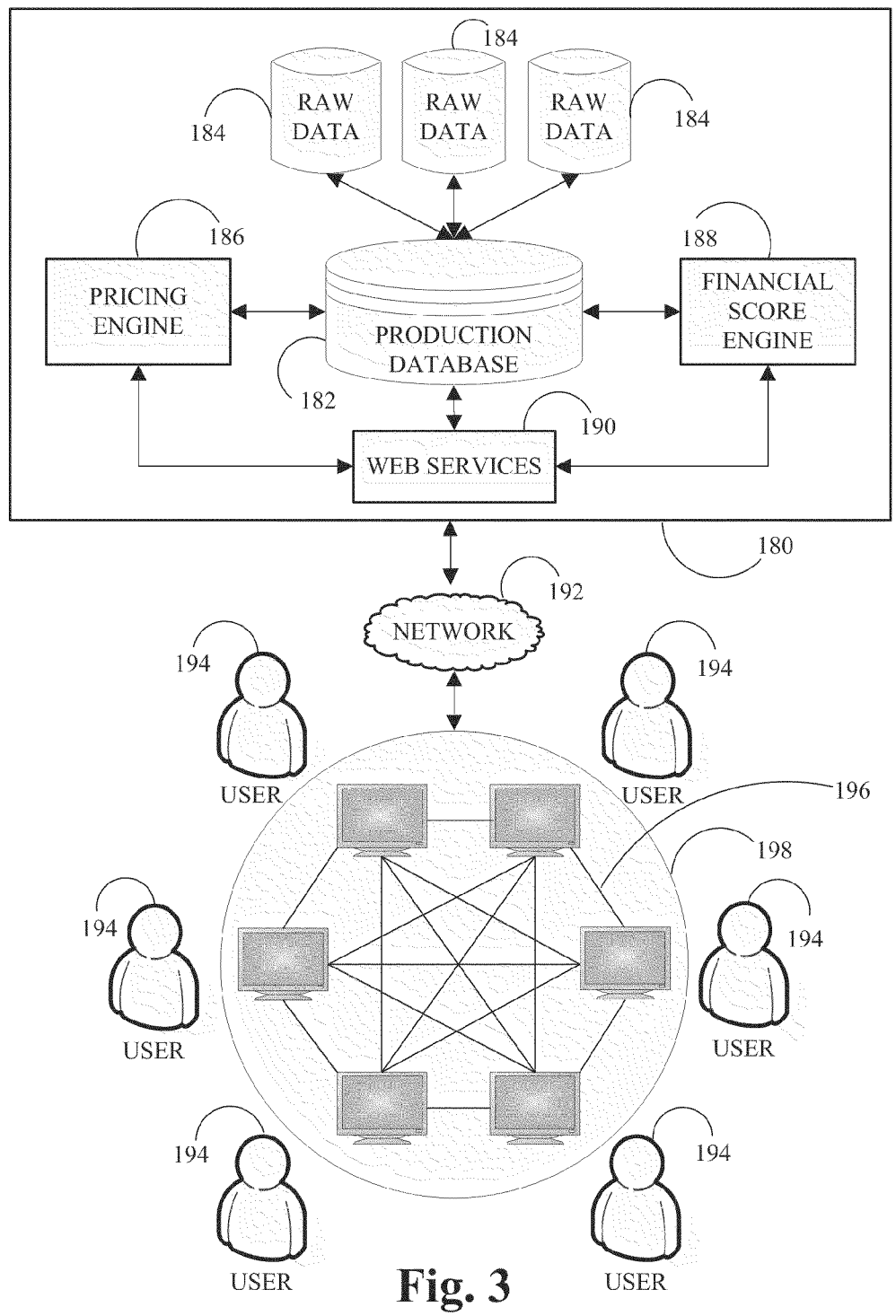
FIG. 3 illustrates a block diagram of a system for processing financial instruments on a peer-to-peer platform according to one embodiment of the present invention.

FIG. 3 illustrates a block diagram of a system 140 for processing financial instruments on a peer-to-peer platform according to one embodiment of the present invention. The system 180 for processing financial contracts online includes a production database 182, a plurality of data stores 184, a pricing engine 186, a financial score engine 188, a web services module 190, a network 192, a plurality of users 194, a social network 196, and a peer-to-peer platform 198.

The production database 182 and data stores 184 may be any suitable type of database or data storage device utilizing known database and data storage technologies as recognized by one skilled in the art, including the storage of data into tables and records, processing and accessing operations. The data stores 184 may include a computer readable medium or any suitable type of physical device capable of having the executable instructions stored thereon, for example the plurality of raw data stores 184 may include an internal memory within a computing system, or in another example the plurality of raw data stores 184 may include an optical disc having the instructions stored thereon. It is recognized that the examples of internal memory and an optical disc are exemplary in nature and are not limiting as to the plurality of raw data stores 184.

The web services module 190 is a software system designed to support interaction over a network. In one embodiment, the web services module 190 includes an Application Programmer's Interface ("API") that may be accessed over a network 192, for example the Internet, and executed on a remote system hosting the requested services. In another embodiment, the web services module 190 includes a social network, a financial score generator, an interface module for delivering a plurality of interface modes, and an auctioning/bid-ask matching module.

In an embodiment, the plurality of users 194 includes borrowers and lenders. Other participants or combinations of participants may be used. The social network 196 may be implemented as software for associating a social structure made of nodes. For example, the social structure made of nodes may be the plurality of users 194. In one embodiment, the social network 196 software connects or associates the plurality of users by one or more specific types of attributes, including for example, educational institution, industry, focus, vision, idea, financial exchange, friendship, kinship, dislike, conflict, gender, age, ethnicity and political affiliation.

In an embodiment, the peer-to-peer platform 198 is a computer network using the diverse connectivity between participants in a network rather than conventional centralized resources where a single node or relatively low number of nodes provide the core value to a service or application. In one embodiment, the peer-to peer platform 198 connects the plurality of users 194 via the social network 196.

Figure 4:
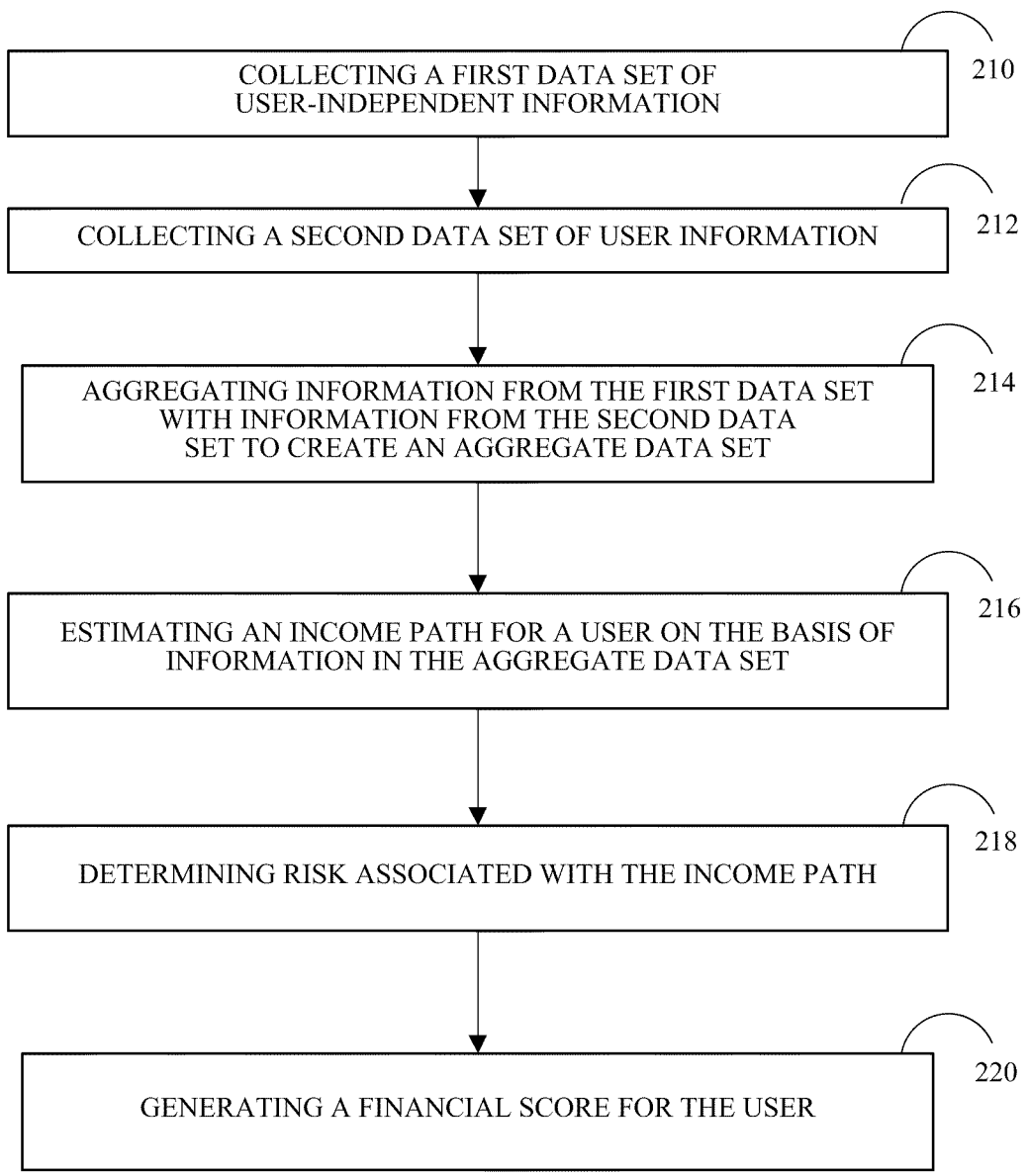
FIG. 4 illustrates a flow diagram of a method for generating a financial score according to one embodiment of the present invention.

FIG. 4 illustrates a flow diagram of a method for generating a financial or human capital score according to one embodiment of the present invention.

In an embodiment, the first step is collecting a first data set of user or borrower independent information, step 210, which may be referred to as user-independent information. In one embodiment, such independent information includes collecting information from the Panel Study of Income Dynamics ("PSID") database. The PSID is a longitudinal income study of a representative sample of U.S. individuals including men, women, and children, and the family units in which they reside. The file structure for the PSID is a single-year family file and a cross-year individual file. In another embodiment, collecting a first data set of user-independent information, step 210, includes collecting information from the Baccalaureate and Beyond Longitudinal Study (B&B.) The B&B provides information concerning education and work experiences after completion of bachelor's degrees. The B&B may also provide cross-sectional information 1 year after bachelor's degree completion, comparable to the Recent College Graduate ("RCG") Survey, and longitudinal data concerning entry into and progress through graduate-level education and the workforce. Any number of types of user-independent data may be collected and used, alone or in combination with other types of user-independent data, consistent with the scope of the invention.

The next step in an embodiment is collecting a second data set of user information, step 212. In one embodiment, the step of collecting a second data set of user information, step 212 includes collecting information through a form. For example, a user 122 of the system in FIG. 1 may be presented with a web form for entering user information. Alternative embodiments are within the scope of the invention, such as collection of user information through paper forms which information will then be converted to electronic form for use in the inventive method and systems. User information may include profile information including name, address, age, social security and general financial data, as well as schools attended or to be attended, major or minor courses of study, career intentions, education records, grade point averages (GPAs), standardized test score results or myriad other data types or combingations.

In an embodiment, the next step is aggregating information from the first data set with information from the second data set to create an aggregate data set, step 214. In one embodiment, the step of aggregating information from the first data set with information from the second data set to create an aggregate data set, step 214, includes selecting a cross section of data from a given data set, reformatting the cross section of data selected and merging the data into a single record, file, data storage device or database. The step of aggregating the data may, in some embodiments, be a method of merging, combining, organizing or sorting the data sets or portions of the data sets. For example, taking data from third party sources, such as user-independent data as survey data or data from studies of certain populations, the system attributes to an individual various attributes, occupations, educations, age, gender, etc. The data sets may then be used to predict average income levels for individuals with the given attributes. This may be done for labor income, how much an individual may earn on average, or household income. If an individual has an interest in a financial contract, such as a loan, where an individual may pay a fixed fraction of their income, this may be associated with a labor income attribute. If an individual has an interest in a student loan, where a fixed dollar amount may be necessary, then total family income attribute will be weighted accordingly.

Turning to step 216, the step of estimating an income path for a user based at least in part on the information in the aggregate data set is shown. In one embodiment, the step of estimating an income path for a user on the basis of information in the aggregate data set includes predicting a periodic salary value expected for a given range of time. For example, step 216 may estimate the income path for the user by predicting a salary value per year for 10 years. Other periods and ranges may be used and are excluded for purposes of clarity only.

In an embodiment, to predict income, the system may regress log labor income on a variety of predictors such as age, polynomial functions of age, occupations, polynomial functions of those, etc. Based on the predicted income, the system may predict an "e", which refers to residuals or deviations from predicted income. As shown in the table below, the system may plot a predicted income path. The example illustrates two income paths for two hypothetical people, one in nursing at the bottom, and one in science and engineering at the top. Both levels are different and slopes are different. Therefore, observable attributes of an individual the system may predict the trajectory of income based on their GPA or School.

TABLE 1

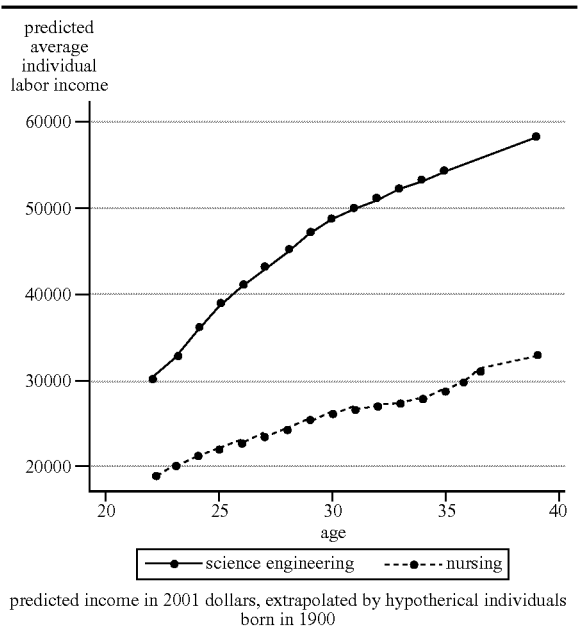

predicted income in 2001 dollars, extrapolated by hypotherical individuals born in 1900

With respect to residuals, the system may construct different features of the rate at which their income moves around and measure the risk associated of their income. One of the observable factors for measuring risk includes the type of occupation an individual selects. Other observable factors include a geographic selection and the age of the individual. Therefore, with the observable factors incorporated, the volatility of an income path may be predicted. In one embodiment, transitory volatility is the year to year volatility due to random flips of the coin. For example, the occupation "Investment Banker" may have a lot of transitory volatility associated with it because it generally depends on bonuses which are based on the success of that year. In other fields, the transitory volatility may be determined by the type of raise an individual generally receives in that field or the types of promotions available to individuals in that field. Non-random factors may be used.

In some embodiments, with the income path and associated volatility, the pricing engine may price a financial contract. If the financial contract is a student loan, the pricing engine may take in the repayment term and the forgiveness features as variables. Other variables available to the pricing engine will be apparent to a person of skill in the art. With an income path, the associated volatility of the income path and the requisite variables, the pricing engine may determine the maximum percentage of income that an individual would be able to devote to a repayment schedule.

In some embodiments, the pricing or financial scoring engine may simulate numerous potential income paths for a given individual. For example, with an individual earning a simulated income of x dollars in a given year, the individual's ability to make payments in that year may be determined. From this stream of hypothetical incomes, the system may generate a stream of hypothetical payments. From there, the system may discount then present value and then determine the appropriate interest rate to produce a sound investment.

Returning to FIG. 4, the next step in an embodiment is determining risk associated with the income path for the user, step 218. In one embodiment, the step of determining risk associated with the average income path includes estimating the distribution of changes in the average income path, and therefore the risk. In other words, the distribution of income levels for a given user may include a representation of the likelihood that the given user will earn a percentage of or a multiple of the average income estimated. With this information, the step of determining risk associated with the average income path for the user may include a prediction of the expected cash flows of any financial instrument where the amount paid is a function of current or past income as discussed above.

The next step is generating a financial score for the user on the basis of the income path and associated risk, step 220. In one embodiment, the step of generating the financial score for the user on the basis of the income path and associated risk step 220 is performed using credit history data for the given user. In another embodiment, the step of generating the financial score uses a scale of 1-10 where 1 is a low financial score indicating poor credit worthiness and where 10 is a high financial score indicating excellent credit worthiness. In yet another embodiment, the financial score may be provided as an image by data visualization techniques that will be apparent to those having skill in the art.

Figure 5:
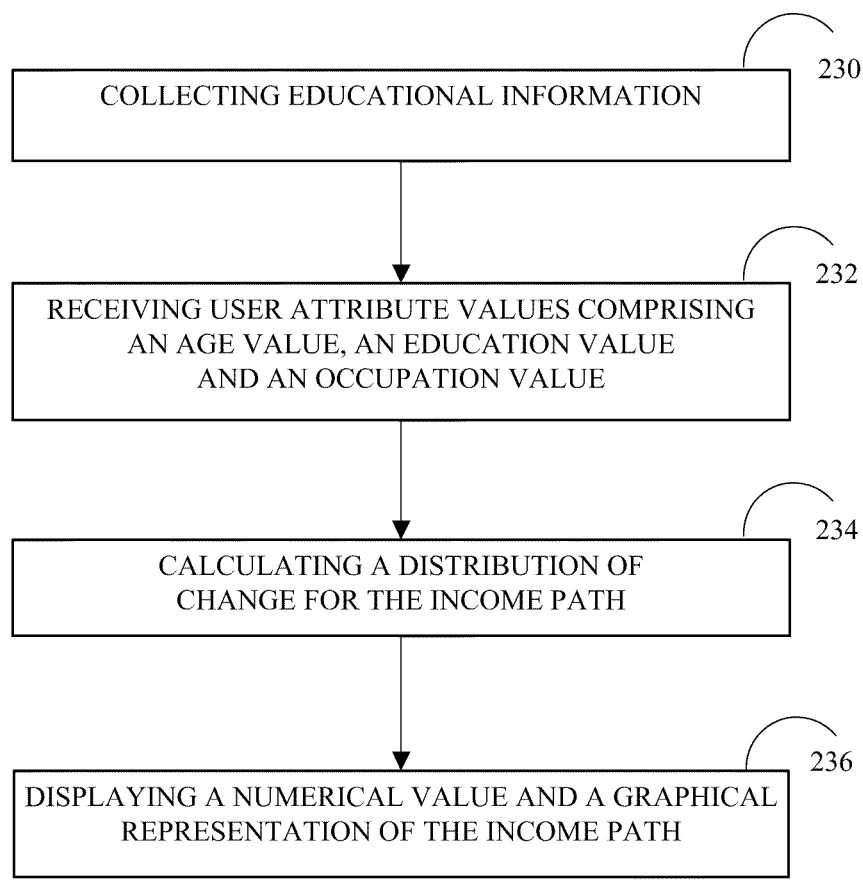
FIG. 5 illustrates a flow diagram of a method for generating a financial score according to another embodiment of the present invention.

FIG. 5 illustrates a flow diagram of a method for generating a financial score according to another embodiment of the present invention. The first step is collecting educational information, step 230. With reference back to FIG. 4, the step of collecting educational information, step 230, may be an additional step included in the steps of collecting a first data set of user-independent information, step 210, or of collecting a second data set of user information. Thus, in some embodiments, general education information which pertains to a group of people or categories (such as institution names, hiring rates, degrees conferred, average incomes after graduation, average exam scores or standardized test scores and myriad other like data items) may be collected and, or in the alternative, education information specific to the user or borrower may be collected (such as an academic standing report, graduation year(s), degree(s), major(s), minor(s), GPAs or specific grades, transcript(s), or exam score(s) or standardized test scores).

The next step is receiving a set of user attribute values which, in some embodiments, comprises an age value, an education value, an occupation value and an industry value, step 232. Modifications to the attribute types and combinations may readily be made without departing from the scope or intent of the invention. As with the collection of educational information, in some embodiments, the step of receiving a set of user attribute values, step 232, may be an additional step included in the step of collecting a first data set of independent information and/or the step of collecting a second data set of user information of FIG. 4, wherein for the first data set the user attribute values are values which are as to a general population or category but within a set of categories in common with the user or borrower, and for the second data set the user attribute values are values which are specific to the user or borrower. Numerous attribute value types may be used in varying combinations, such as receiving a gender value, an interest value, a statement value, a political affiliation value, a resume value, a volunteer history value, a desired finances value, a date value, a payment value, an interest rate value and a maturity value.

The next step is calculating a distribution of change for an income path, step 234. In one embodiment, the step of calculating a distribution of change for the income path, step 234, may be an additional step in the step of determining risk associated with the income path for the user, step 218 of FIG. 4. Other embodiments of calculating a distribution of change for the income path, step 234, are contemplated such as described in the above description of step 218.

The next step is producing a numerical value or other representation, which may be graphical, of the income path, step 236. In one embodiment, step 236 may be an additional step in the generating the financial score for the user on the basis of the average income path and associated risk, step 220 of FIG. 4. As mentioned above, this may be accomplished by various data visualization techniques known to those with skill in the art.

Figure 6:
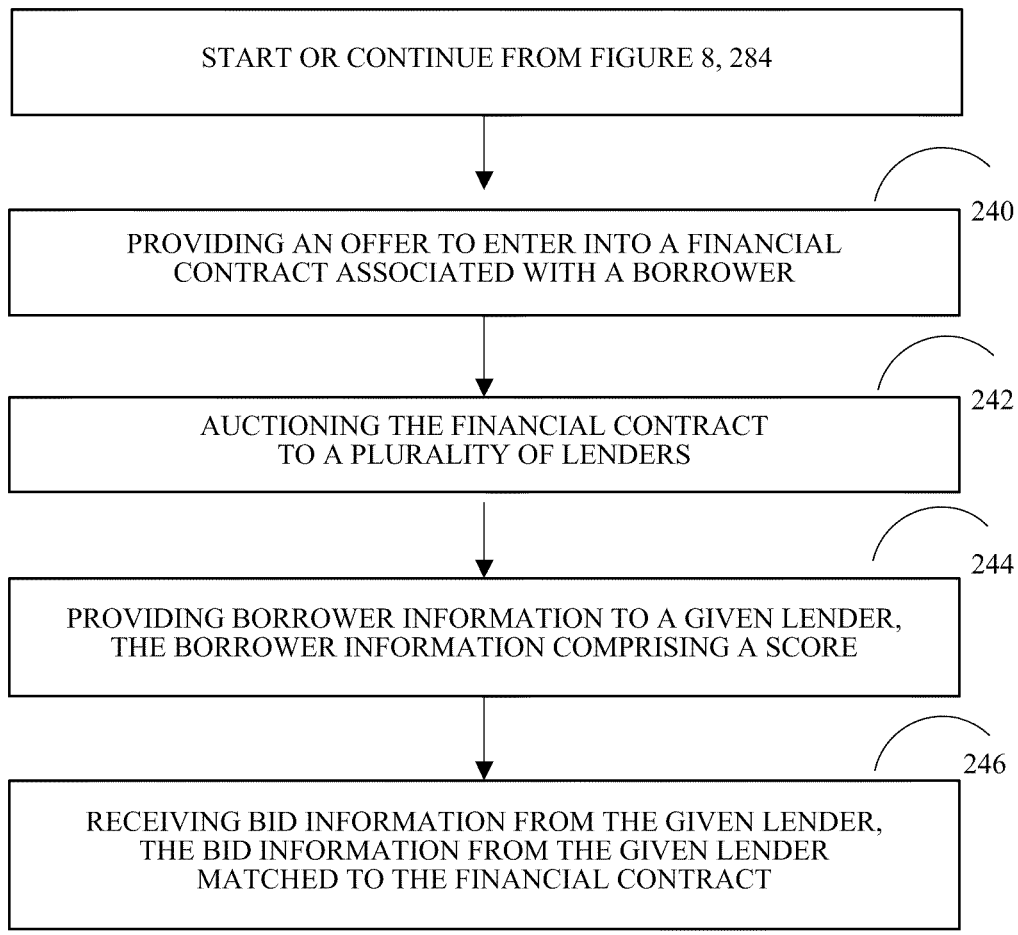
FIG. 6 illustrates a flow diagram of a method for processing financial instruments on a peer-to-peer platform according to one embodiment of the present invention.

FIG. 6 illustrates a flow diagram of a method for processing financial instruments on a peer-to-peer platform according to one embodiment of the present invention. In one embodiment, the platform is peer-to-peer credit auction forum that enables prospective borrowers to place and display listings for loans, and enables lenders who wish to commit to purchase loans extended to borrowers to bid on those listings, in some cases in amounts less than the entire loan amount being requested in the listing. Any individual or institution may register as a lender.

It should be noted that the use of the term "lender" does not require an individual or institution registered as a lender to lend capital directly to a borrower. Instead, lenders registered on the platform, in some embodiments, make a purchase commitment by purchasing a note from a platform operator which represents the lenders commitment to purchase the loan to the ultimate borrower from the platform operator.

The first step of the method illustrated in FIG. 6 is providing or displaying an offer to enter into a financial contract, the financial contract associated with a borrower, step 240. In one embodiment, the display of the offer to enter into a financial contract is an entry on a web page. In another embodiment, the display of the offer to enter into a financial contract is a listing in a set of search results. In yet another embodiment, the display of an offer is a report or part of a watchlist. For example, a watchlist may be a list of offers or users that a given user may want to watch or otherwise keep track of. Other display means may be used without departing from the scope of the invention. In some embodiments, the offer is the result of or based upon performance of steps 280, 282 and 284 described below.

The next step is auctioning the financial contract associated with the borrower to a plurality of lenders, step 242. In one embodiment, the system 140 of FIG. 2 accomplishes the step auctioning the financial contract associated with the borrower to a plurality of lenders, step 242, by presenting an interface, usually a web based application, allowing a lender to bid on a given financial contract existing on the system. In another embodiment, the system 140 of FIG. 2 may present an auction interface where a lender may browse the available offers. In this respect, through the use of various filters, to be described below, the lender may browse a set of offers satisfying a given criteria. For example, the lender may indicate a given interest rate as a desired return on investment or various borrower criteria including but not limited to user attribute data or other user information as described above.

The next step is transmitting borrower information to a given lender requesting information associated with the borrower, step 244. In one embodiment, the transmission of information may include a financial score as generated by the method described in FIG. 4. In another embodiment, the step of transmitting information to a given lender, step 244, includes a comprehensive report comprising a borrower profile, a customized credit score, an industry report, an academic report and a borrower statement, or some subset of the foregoing or like borrower data summaries. In some embodiments, the specific borrower data types or summaries are selected by the lender. Other similar facets of a comprehensive report may be included and are only omitted for purposes of clarity.

The next step is receiving bid information from the given lender, the bid information from the given lender matched to a given financial contract, step 246. In one embodiment, the system 140 of FIG. 2 accomplishes the step of receiving bid information from the given lender, the bid information from the given lender matched to a given financial contract, step 246, by allowing a lender to bid on the entire amount requested in the financial contract. In another embodiment, the lender may bid on a fractional amount requested in the financial contract. If a listing for a financial contract obtains a bid or bids in an amount totaling the amount requested in the financial contract, the winning bids at the time the listing expires are matched with the listing.

In an embodiment, the platform operator verifies financial information of for lender and/or borrowers. In one embodiment, the platform operator determines if the lender possesses the funds necessary to satisfy a given bid or obtain other information sufficient to confirm the adequacy of the lender to fulfill the financial contract. In another embodiment, the platform operator may take commercially reasonable efforts to authenticate the identity of the borrower, confirming that the borrower has full legal capacity to execute and deliver a given note and that each note is a legal, valid and binding obligation of the borrower.

In one embodiment, a website operator will disburse the proceeds of a given financial contract. The website operator may then transfer the requested amount to the borrower in exchange for separate notes in the amount of each winning bid. Capital may be transferred from the website operator's own banking account via electronic transfer. In some embodiments, the borrower will pay a transaction fee upon the disbursement of the capital transferred. Capital may also be transferred to a third-party designee of the borrower, such as an educational institution.

Figure 7:
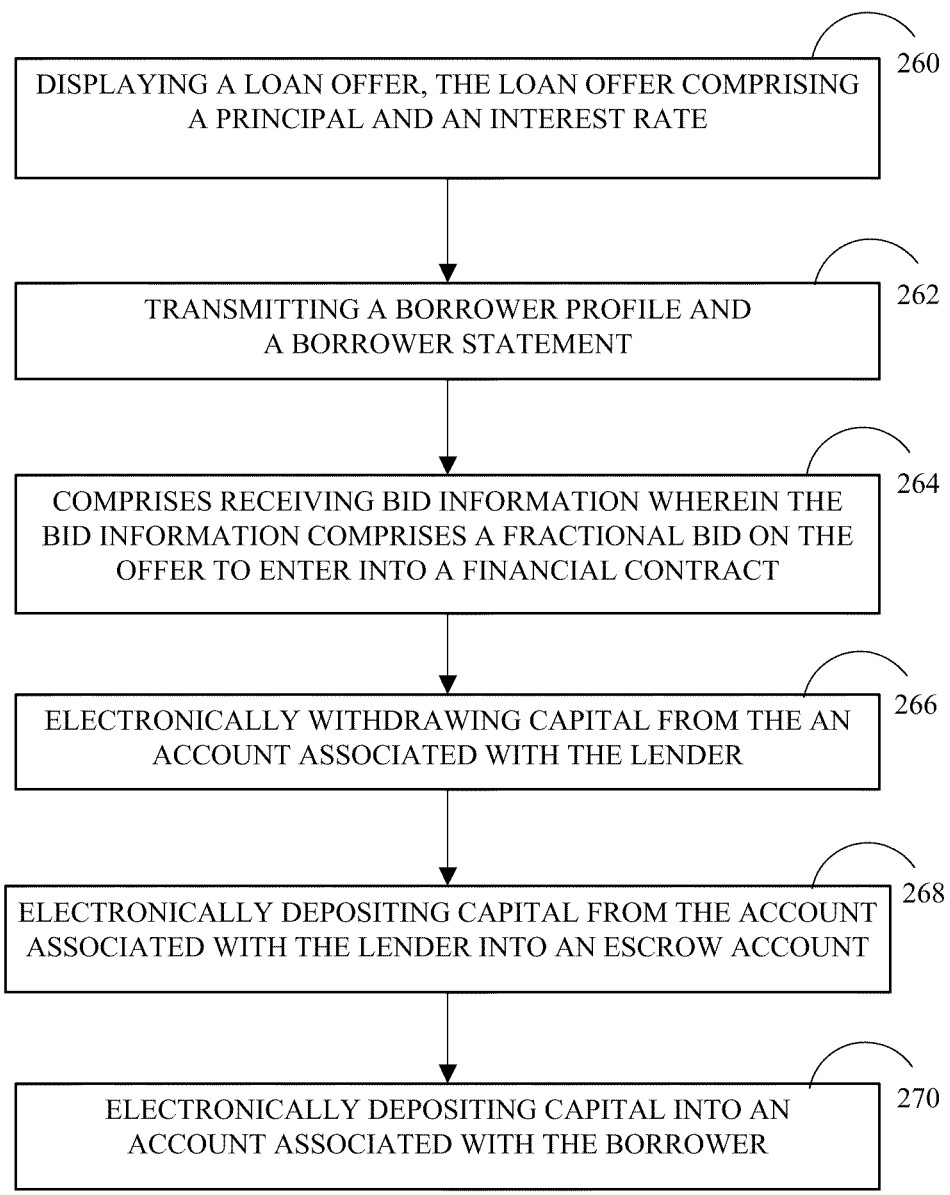
FIG. 7 illustrates a flow diagram of a method for processing financial instruments on a peer-to-peer platform according to another embodiment of the present invention.

FIG. 7 illustrates a flow diagram of a method for processing financial instruments on a peer-to-peer platform according to another embodiment of the present invention. The first step is displaying a loan offer, the loan offer comprising a principal amount and one or more interest rate(s) and/or term(s), step 260. In one embodiment the step of displaying a loan offer comprising a principal and an interest rate is an additional step of step 240 of FIG. 6. In another embodiment, the step of displaying a loan offer comprising a principal and interest rate may be combined with displaying a user profile associated with the loan offer. In yet another embodiment, the step of displaying a loan offer comprising a principal and interest rate may be combined with other supplementary reports, including but not limited to industry and educational reports.

The next step is transmitting a borrower profile and a borrower statement, step 262. In one embodiment, the step of transmitting a borrower profile and a borrower statement is an additional step of step 244 of FIG. 6. In another embodiment, the step of transmitting a borrower profile and a borrower statement may be combined with other supplementary reports, including comparison reports, industry reports and educational reports.

The next step is receiving bid information wherein the bid information comprises a total or a fractional bid on the offer to enter into a financial contract, step 264. In one embodiment, the step of receiving bid information wherein the bid information comprises a fractional bid on the offer to enter into a financial contract is an additional step of step 246 of FIG. 6.

The next steps are electronically withdrawing capital from the an account associated with the lender, step 266; electronically depositing capital from the account associated with the lender into an escrow account, step 268; and electronically depositing capital into an account associated with the borrower, 270.

Figure 8:
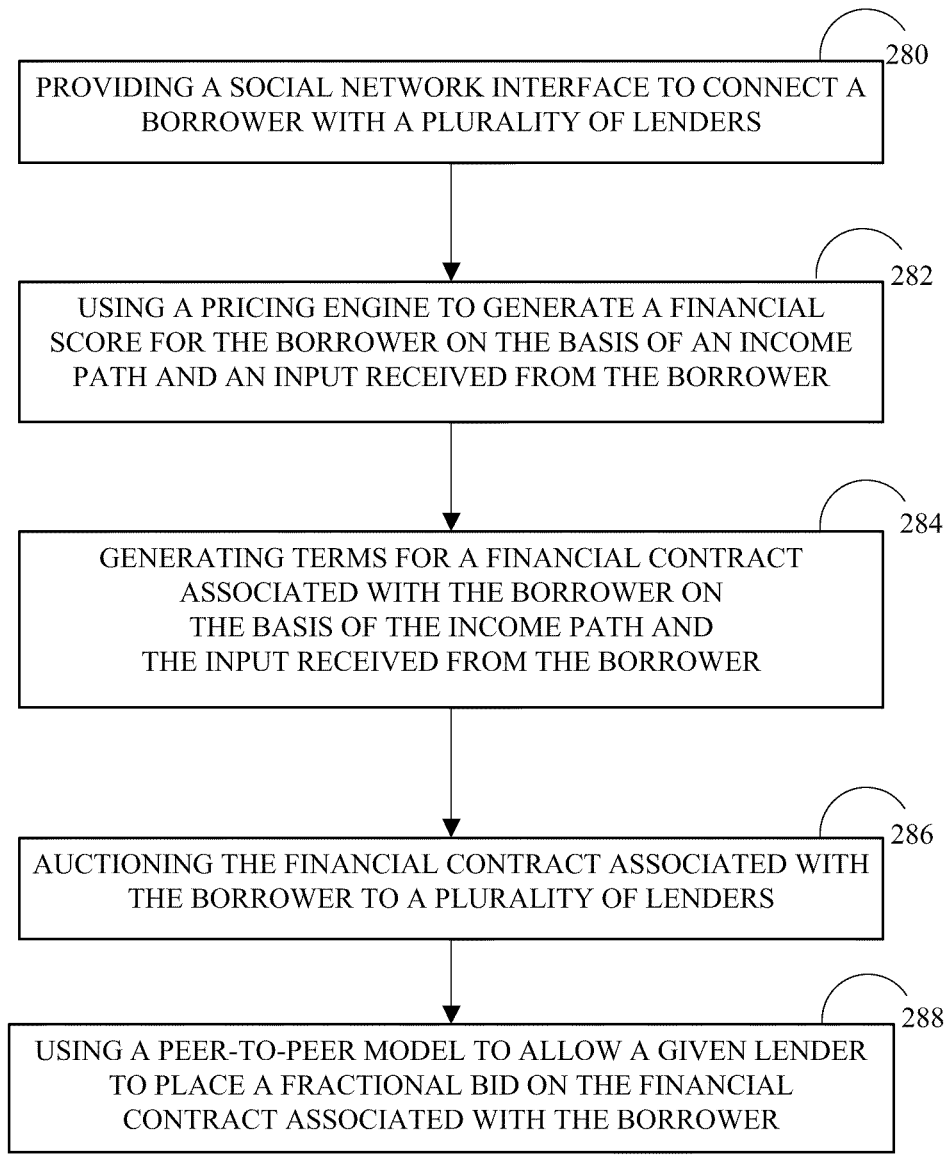
FIG. 8 and FIG. 9 illustrates flow diagrams of a method for processing financial contracts online according to one embodiment of the present invention.

FIG. 8 illustrates a flow diagram of a method for processing financial contracts online according to one embodiment of the present invention. The first step is presenting a social network interface to connect a borrower with a plurality of lenders, step 280. In one embodiment, the system 180 of FIG. 3 presents a social network via a web based interface. The web based interface may include social networking technologies known to those of skill in the art. In another embodiment, the system 180 of FIG. 3 presents the social network in a mobile interface over a mobile platform. In yet another embodiment, any combination of the systems of FIGS. 1-3 may be combined to present a social network interfaces on a variety of platforms known by a person of skill in the art.

The next step is using a pricing engine to generate a financial score for the borrower on the basis of one or more inputs received from the borrower and an income path, step 282. In one embodiment, the pricing engine generates the financial score as described by the method in FIGS. 3-4. In another embodiment, the pricing engine includes additional factors and/or receives a customized set of criteria from a user to generate a customized financial score. The customized set of criteria, in some embodiments, is determined through one or more selections of data types by the user for use in calculating the financial score. In some embodiments, the data type options are presented to the user through form fields, buttons or other interface selection options as will be apparent to one of skill in the art. In another embodiment, the pricing engine performs the following steps: 1) predict expected income; 2) predict deviations from expected income/income risk; 3) simulate income given predicted income path, estimations of income risk and a user's attributes and 4) price a given product given simulated income. In yet another embodiment, the pricing engine regresses a log of labor income on a given number of variables, for example, age, polynomial functions of age, occupation, polynomial functions of occupation, date, range, and the like.

The next step is generating terms for a financial contract associated with the borrower on the basis of an income path, an associated risk associated with the income, and the input received from the borrower, step 284. In one embodiment, generating terms includes receiving two input variables. The first variable is income path and associated risk. The second variable is a given financial contract. The given financial contract may include a term, a forgiveness clause, minimum bid amount, maximum fraction of income amount, percentage of income amount and the like. In another embodiment, the step of generating terms may include generating a principal amount, an interest rate, a payoff amount, a deferment or forbearance clause, a garnishment amount, a reward or bonus clause for timely payments, and a payment calendar, or any one or more of the foregoing or other terms.

The next step is auctioning the financial contract associated with the borrower to a plurality of lenders, step 286. In one embodiment, the step of auctioning the financial contract associated with the borrower to a plurality of lenders is the same as the auctioning step of FIG. 6. The next step is using a peer-to-peer model to allow a given lender to place a bid, which in some embodiments is a fractional bid, on the financial contract associated with the borrower, step 288. In one embodiment, the peer-to-peer model will require a lender to bid a minimum amount. In other embodiments, the lender will be able to bid fractional amounts to a group, the group bidding on a plurality of borrowers with some common characteristic.

Figure 9:
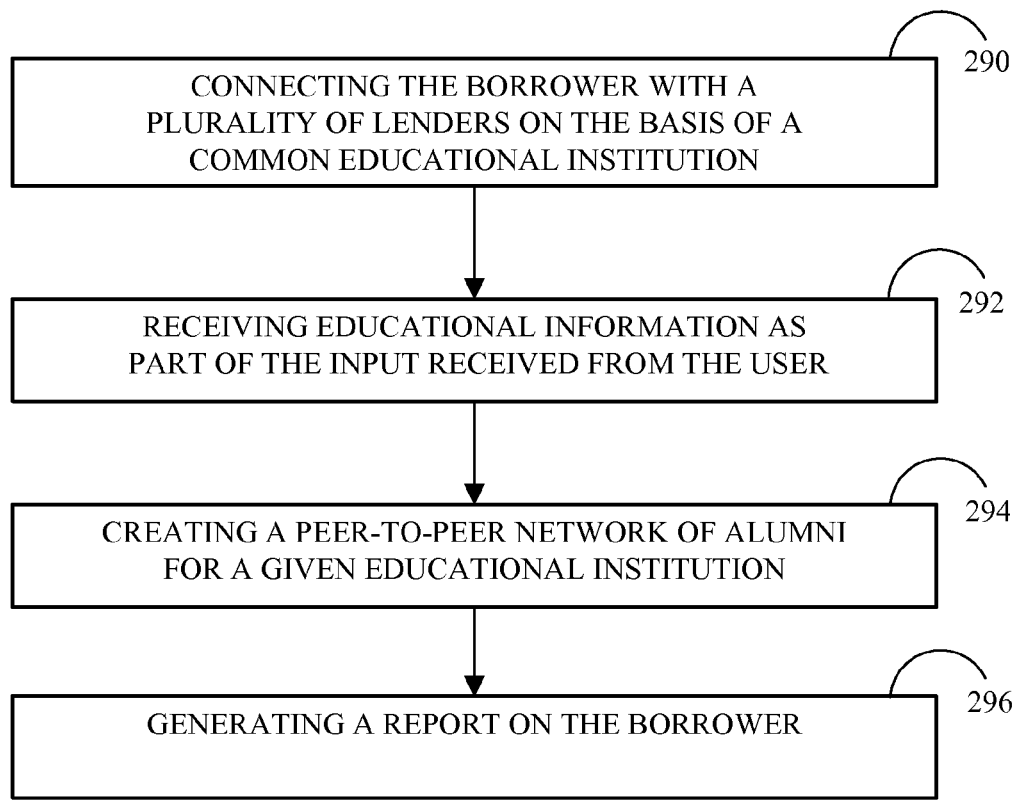

Referring to FIG. 9, the next step is electronically executing the financial contract associated with the borrower, step 290. In one embodiment, the step of electronically executing the financial contract associated with the borrower, step 290, may be accomplished with electronic funds transfer techniques known by a person with skill in the art.

In some embodiments, the first step may be connecting the borrower with a plurality of lenders on the basis of a common educational institution. Another step may be receiving educational information as part of the input received from the user, step 292. Yet another step is creating a peer-to-peer network of alumni for a given educational institution. Still another next step is generating a report on the borrower. In one embodiment the step of generating a report on the borrower may be accomplished with any of the techniques as mentioned in the above descriptions of the methods for FIGS. 4-8.

Figure 10:
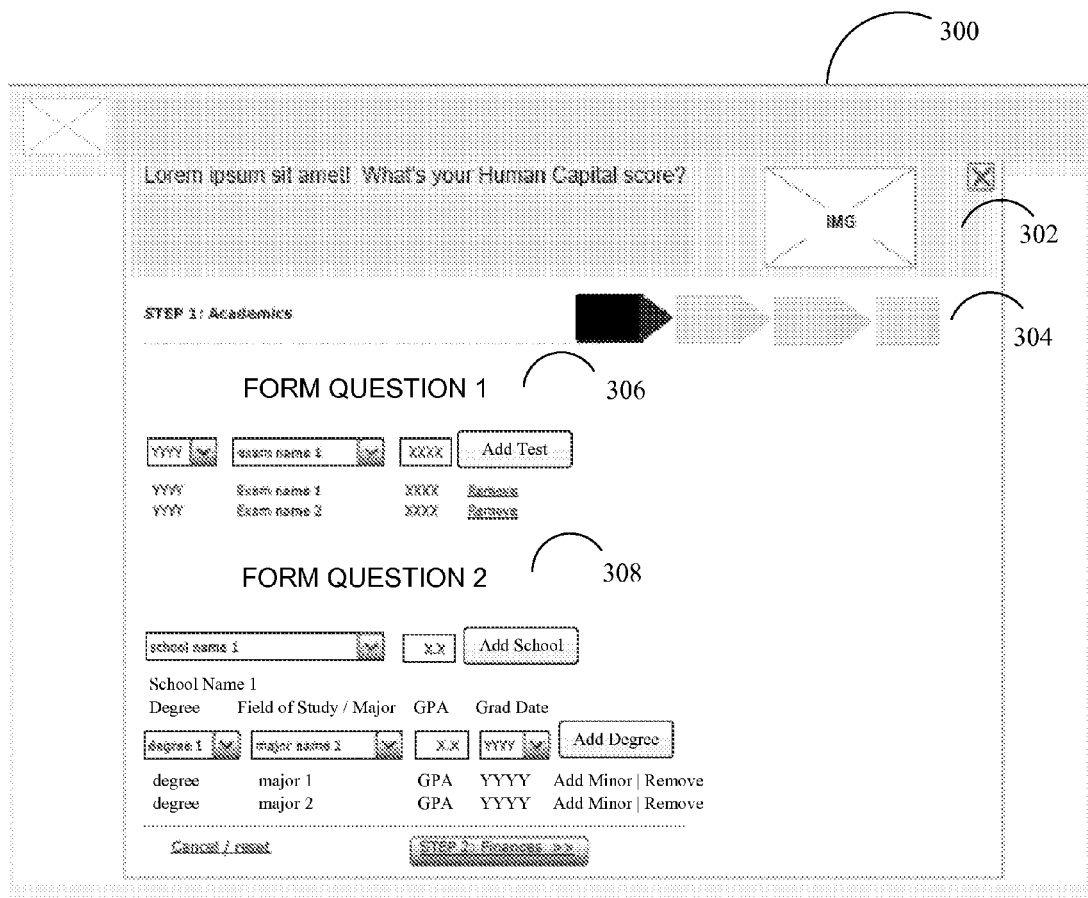
FIG. 10 illustrates a sample output display as generated by a system and method for generating a financial score according to one embodiment of the present invention.

FIG. 10 illustrates a sample output display as generated by the system and method for generating a financial score according to one embodiment of the present invention. The sample output display 300 is representative of one example of means by which borrower information is collected and includes a form 302, visual navigation chart for filling out the form 304, a first form question 306 and second form question 308. The form questions 306 and 308 include a plurality of form objects.

Figure 11:
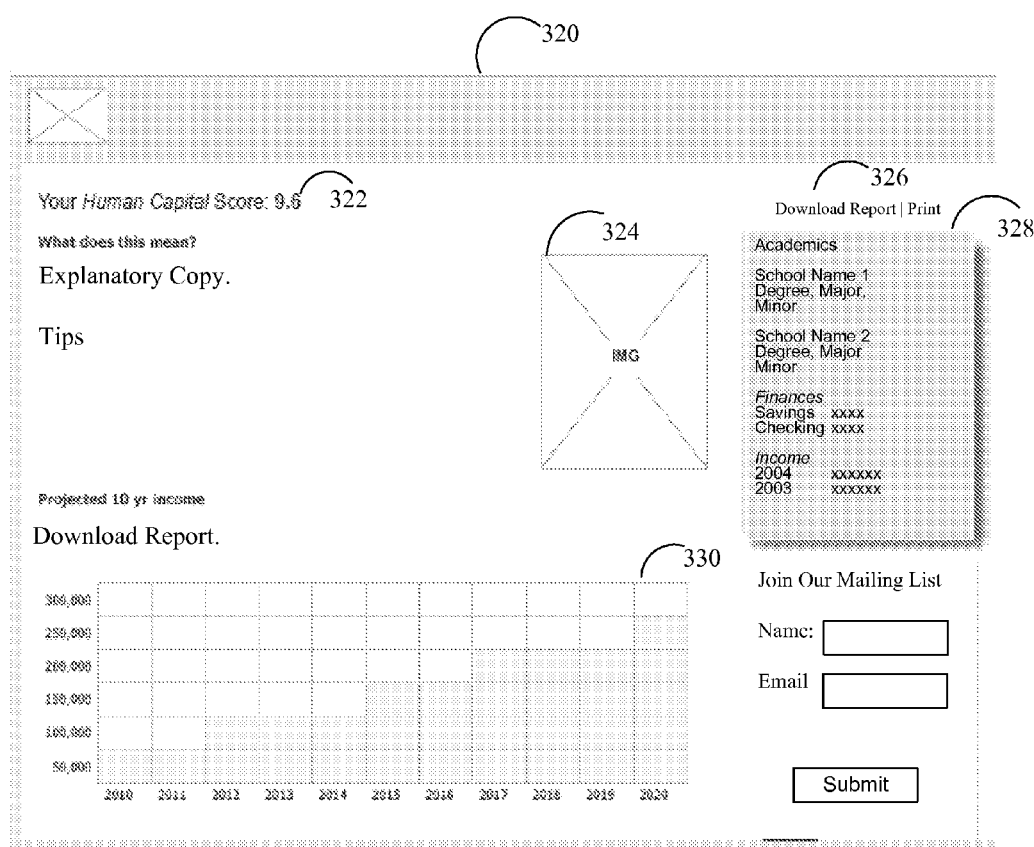
FIG. 11 illustrates a sample output display as generated by a system and method for generating a financial score according to another embodiment of the present invention.

FIG. 11 illustrates a sample output display 320 as generated by the system and method for generating a financial score according to another embodiment of the present invention. The sample output display 320 is representative of one example of means by which a financial score is produced, in this case to be viewed by a user, a borrower or lender or other use of the system, and includes a numerical score 322, a visual score placeholder 324, a downloadable report 326, a summary box 328, and a chart 330.

Figure 12:
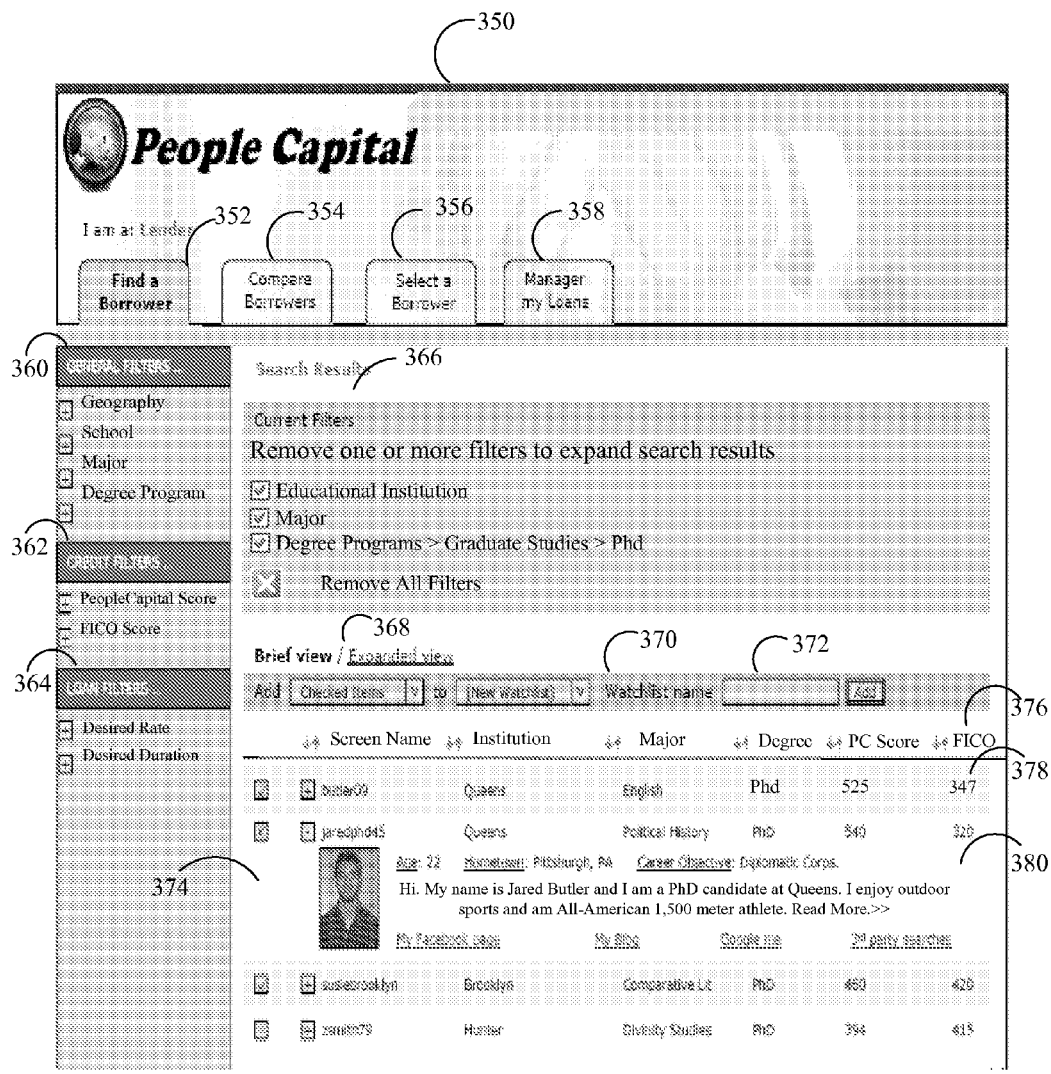
FIG. 12 illustrates a sample output display as generated by a system and method for processing financial instruments on a peer-to-peer platform according to one embodiment of the present invention.

FIG. 12 illustrates a sample output display 350 as generated by the system and method for processing financial instruments on a peer-to-peer platform according to one embodiment of the present invention. The sample output display 350 is representative of an example of means by which a lender locates potential borrowers or financial contracts and includes a find a borrower tab 352, a compare borrowers tab 354, a select a borrower tab 356, a manage my loans tab 358, a general filters form 360, a credit filters form 362, a loan filters form 364, a current filters form 366, a brief/expanded mode object 368, a watchlist 370, a search box 372, a display of the candidate borrowers 374, a row of columns 376, a candidate entry as displayed in brief view mode 378, and a candidate borrower as displayed in expanded view mode 380.

Figure 13:
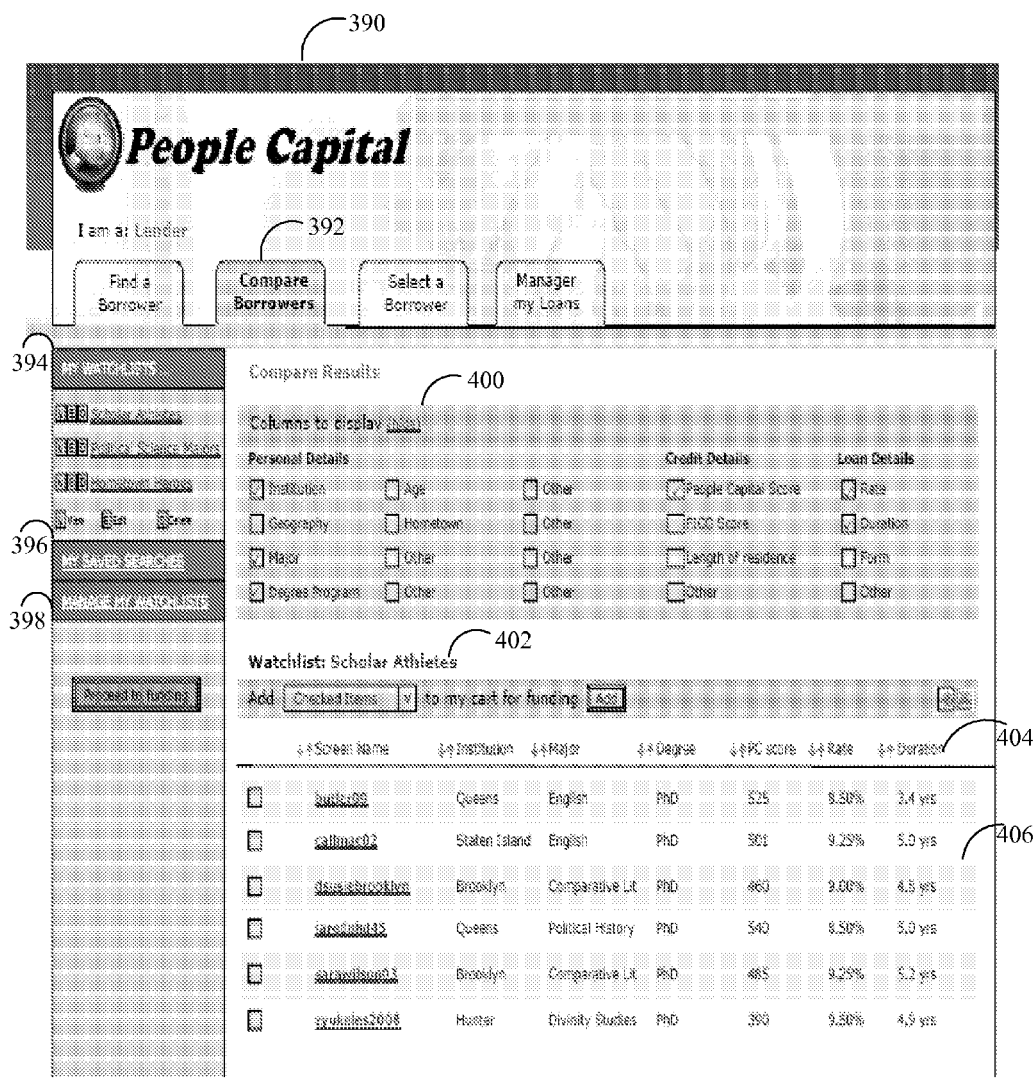
FIG. 13 illustrates a sample output display as generated by a system and method for processing financial instruments on a peer-to-peer platform according to another embodiment of the present invention.

FIG. 13 illustrates a sample output display 390 as generated by the system and method for processing financial instruments on a peer-to-peer platform according to another embodiment of the present invention. The sample output display 390 is representative of an example of means by which a lender selects borrowers and includes a Compare Borrowers tab 392, a my watchlist object 394, a my saved searches object 396, a manage my watchlist object 298, column chooser 400, a watchlist displayed object 402, a row of columns comprising the chosen columns 404 and a listing of borrower information 406. FIGS. 10-12 illustrate various exemplary screen shots for pull down menu search options. It is noted that in addition to the pull down menu search options, there are also data entry field options, and that many variations on the displays may be made consistent with and without departing from the scope of the invention.

Accordingly, through systems and methods, users are presented with ready access to the plethora of information in a convenient and easy to use format. Through the inclusion of the toolbar interface and the data visualization techniques, users may be presented with direct access to the information about users on the system via the peer-to-peer platform and social network interfaces, as well as the inclusion of various additional interfacing options for financial-related information, including watchlist personalization of the interface, searching operations, advertising, industry information, portfolio management, among others. The method and system provides ready access to the information in a user-friendly manner overcoming the arcane access to this information by existing web-interfacing techniques, and thereby making information more accessible and hence lending and borrowing to individuals in need easier.

FIGS. 1 through 13 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed:

1. A computer-implemented method for generating a financial score, comprising:
    collecting a first data set of user-independent information, the first data set having values of a general population within a category common to a user, including individual income and education information;
    collecting a second data set of user information, the second data set being specific to the user;
    aggregating information from the first data set with information from the second data set to create an aggregate data set;
    storing the aggregate data set on a computer readable medium;
    using at least one processor, predicting a future income path for the user on the basis of information in the aggregate data set, the future income path comprises at least one possible realization of income in the future;
    determining risk associated with the predicted future income path, wherein the risk comprises a deviation from the predicted future income path; and
    generating a financial score for the user based on the predicted future income path and the risk associated with the predicted future income path.

2. The method of claim 1 wherein the step of collecting the second data set of comprises collecting educational information.

3. The method claim 1 receiving user attribute values comprising an age value, an education value and an occupation value of the user and predicting the future income path based on the user attribute values received.

4. The method of claim 1 wherein the step of determining risk associated with the income path comprises calculating a distribution of change for the income path.

5. The method of claim 1 wherein generating the financial score for the user comprises displaying a numerical value and a graphical representation of the income path.

6. A non-transitory computer readable media comprising program code that when executed by a programmable processor causes execution of a method for generating a financial score comprising:
    collecting a first data set of user-independent information, the first data set having values of a general population within a category common to a user, including individual income and education information;
    collecting a second data set of user information, the second data set being specific to the user;

aggregating information from the first data set with information from the second data set to create an aggregate data set;

storing the aggregate data set on a computer readable medium;

predicting a future income path for a user on the basis of information in the aggregate data set, the future income path comprises at least one possible realization of income in the future;

determining risk associated with the predicted future income path, wherein the risk comprises a deviation from the predicted future income path; and generating a financial score for the user based on the predicted future income path and the risk associated with the predicted future income path.

7. The computer readable media of claim 6, wherein collecting the second data set comprises collecting educational information.

8. The computer readable media of claim 6, the method comprising receiving user attribute values comprising an age value, an education value and an occupation value of the user and predicting the future income path based on the user attribute values received.

9. The computer readable media of claim 6, wherein determining risk associated with the income path comprises calculating a distribution of change for the income path.

10. The computer readable media of claim 6, wherein generating the financial score for the user comprises displaying a numerical value and a graphical representation of the income path.

11. A computerized system for generating a financial score, the system comprising: a non-transitory computer readable medium having program code that when executed by a programmable processor causes the programmable processor to execute a method for generating a financial score, comprising:

collecting a first data set of user-independent information, the first data set having values of a general population within a category common to a user, including individual income and education information;

collecting a second data set of user information, the second data set being specific to the user;

aggregating information from the first data set with information from the second data set to create an aggregate data set;

storing the aggregate data set on the computer readable medium;

predicting a future income path for a user on the basis of information in the aggregate data set, the future income path comprises at least one possible realization of income in the future;

determining risk associated with the predicted future income path, wherein the risk comprises a deviation from the predicted future income path; and generating a financial score for the user based on the predicted future income path and the risk associated with the predicted future income path.

12. The system of claim 11 wherein collecting the second data set comprises collecting educational information.

13. The system of claim 11 the method comprising receiving user attribute values comprising an age value, an education value and an occupation value of the user and predicting the future income path based on the user attribute values received.

14. The system of claim 11 wherein determining risk associated with the income path comprises calculating a distribution of change for the income path.

15. The system of claim 11 wherein generating the financial score for the user further comprises displaying a numerical value and a graphical representation of the income path.

16. A method for processing financial instruments on a network, comprising:

displaying, on a networked device, an offer to enter into a financial contract associated with a borrower; auctioning the financial contract to a plurality of lenders;

providing borrower information to a given lender, the borrower information comprising a score generated by a processor based on a predicted future income path of the borrower and a risk associated with the predicted future income path, wherein the future income possible realization of income in the future and the risk comprises a deviation from the predicted future income path;

receiving bid information from the given lender, the bid information from the given lender matched to the financial contract; and storing auction information on a computer readable medium.

17. The method of claim 16 wherein the borrower information further comprises a score chart.

18. The method of claim 16 wherein the borrower information is selected by the given lender.

19. The method of claim 16 wherein the borrower information is associated with the financial contract.

20. The method of claim 16 wherein the step of receiving bid information from the given lender further comprises receiving a fractional bid.

21. Non-transitory computer readable media comprising program code that when executed by a programmable processor causes execution of a method for processing financial instruments comprising:

providing an offer to enter into a financial contract associated with a borrower;

auctioning the financial contract to a plurality of lenders;

providing borrower information to a given lender, the borrower information comprising a score generated based on a predicted future income path of the borrower and a risk associated with the predicted future income path, wherein the future income path comprises at least one possible realization of income in the future and the risk comprises a deviation from the predicted future income path;

receiving bid information from the given lender, the bid information from the given lender matched to the financial contract; and storing auction information on a computer readable medium.

22. The computer readable media of claim 21 wherein the borrower information further comprises a score chart.

23. The computer readable media of claim 21 wherein the borrower information is based on criteria selected by the given lender.

24. The computer readable media of claim 21 wherein the borrower information is associated with the financial contract.

25. The computer readable media of claim 21 wherein receiving bid information from the given lender further comprises receiving a fractional bid.

26. A system for processing financial instruments on a network, the system comprising a non-transitory computer readable medium having program code that when executed by a programmable processor causes the programmable processor to execute a method comprising:

providing an offer to enter into a financial contract associated with a borrower;

auctioning the financial contract to a plurality of lenders;
providing borrower information to a given lender, the borrower information comprising a score generated based on a predicted future income path of the borrower and a risk associated with the predicted future income path, wherein the future income path comprises at least one possible realization of income in the future and the risk comprises a deviation from the predicted future income path;
receiving bid information from the given lender, the bid information from the given lender matched to the financial contract; and
storing auction information on a computer readable medium.

27. The system of claim 26 wherein the borrower information further comprises a score chart.

28. The system of claim 26 wherein the borrower information is based on criteria selected by the given lender.

29. The system of claim 26 wherein the borrower information is associated with the financial contract.

30. The system of claim 26 wherein receiving bid information from the given lender comprises receiving a fractional bid.

31. A method for processing financial contracts online, the method comprising:
providing a social network interface to connect a borrower with a plurality of lenders;
generating a financial score, using a pricing engine for the borrower on the basis of a predicted future income path of the borrower, a risk associated with the predicted future income path, and an input received from the borrower, wherein the future income path comprises at least one possible realization of income in the future and the risk comprises a deviation from the predicted future income path;
executing program code associated with the pricing engine on a processor;
generating terms for a financial contract associated with the borrower on the basis of the income path and the input received from the borrower; auctioning the financial contract associated with the borrower to a plurality of lenders; and
using a peer-to-peer model to allow a given lender to place a fractional bid on the financial contract associated with the borrower.

* * * * *